C. C. LEDERER.
HAND LEVER MECHANISM FOR CULTIVATORS.
APPLICATION FILED OCT. 24, 1918.
1,304,783.
Patented May 27, 1919.
2 SHEETS—SHEET 2.
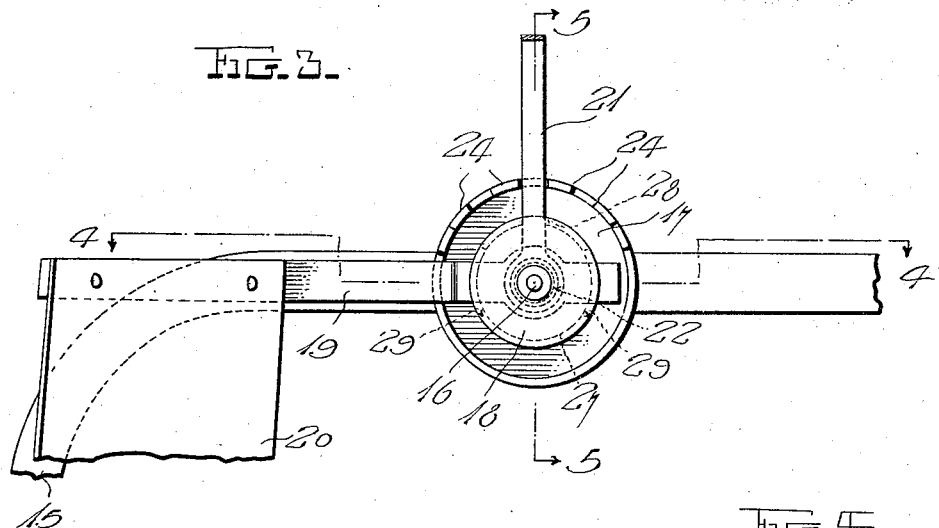
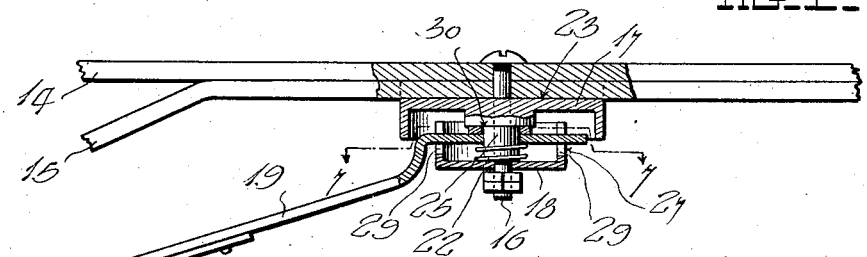
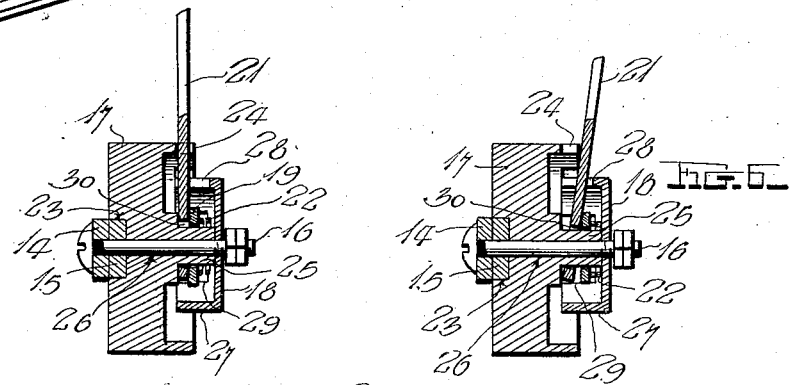

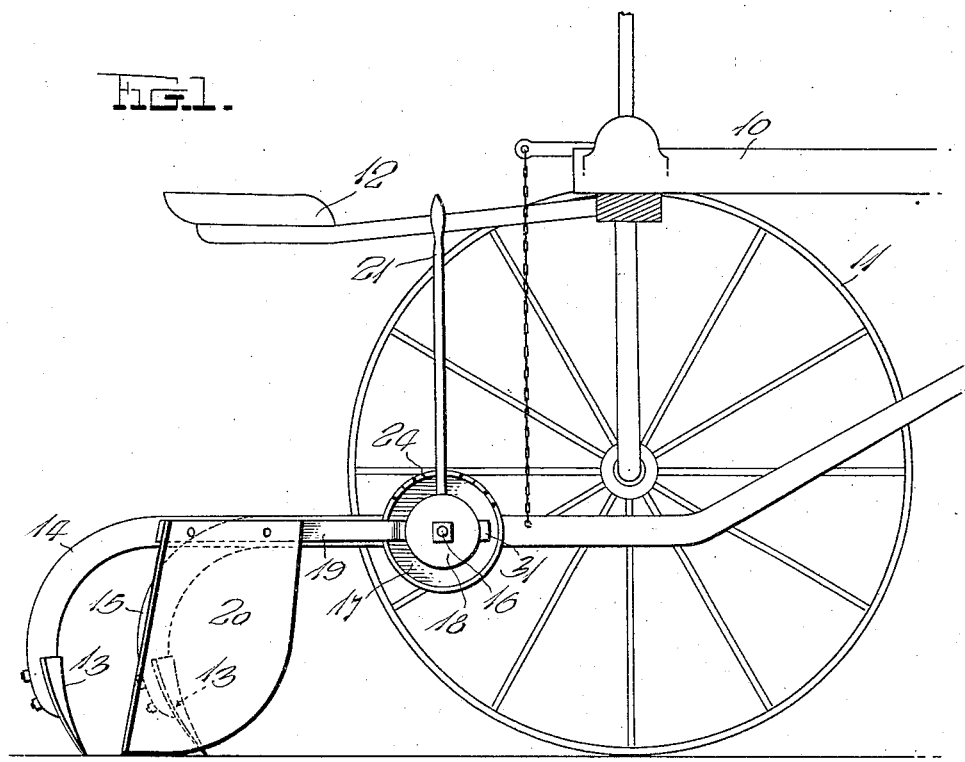

UNITED STATES PATENT OFFICE.

CLARENCE C. LEDERER, OF FOSTER, NEBRASKA.

HAND-LEVER MECHANISM FOR CULTIVATORS.

1,304,783.   Specification of Letters Patent.   Patented May 27, 1919.

Application filed October 24, 1918. Serial No. 259,487.

*To all whom it may concern:*

Be it known that I, CLARENCE C. LEDERER, a citizen of the United States, residing at Foster, in the county of Pierce and State of Nebraska, have invented certain new and useful Improvements in Hand-Lever Mechanism for Cultivators; and I do declare the following to be a full, clear, and exact description of the invention, such as will enable others skilled in the art to which it appertains to make and use the same.

This invention relates to hand lever mechanism for cultivators.

One object of the invention is to provide a device of this character which may be quickly and easily and removably attached to a plow or cultivator beam of ordinary construction, making little or no change in the beam to which it is to be attached.

Another object is to provide for automatic vertical adjustment of the fender plate, so as to prevent injury thereto in case it collides with a rock, stump, root or other obstacle.

Another object of the invention is to provide a device of this character whereby the plowman or operator may quickly and easily adjust the fender vertically, according to the depth of the plowing, and may raise the fender plate a distance above the ground when desirable.

Another object is to provide a device of this character which consists of few and simple parts which may be cheaply manufactured and assembled so that the cost of manufacture is reduced to a minimum.

Other objects and advantages may become apparent to persons who read the following details of description in connection with the accompanying drawings, in which:

Figure 1 is a side elevation ilustrating my invention applied to a sulky plow or cultivator;

Fig. 2 is a top plan view of a pair of plow or cultivator beams having my improved fender attached thereto;

Fig. 3 is an enlarged side elevation of the principal elements which constitute the present invention;

Fig. 4 is a view partly in top plan and partly in section along the line 4—4 of Fig. 3;

Fig. 5 is a transverse vertical sectional view along the line 5—5 of Fig. 3;

Fig. 6 is a transverse sectional view similar to Fig. 5, but the hand-lever being deflected into the position in which it may be moved from one to another of its adjusted positions;

Fig. 7 is a vertical sectional detail view, and

Fig. 8 is a perspective detail view of one of the elements of the device which constitutes this invention.

Referring to these drawings in detail, in which similar reference characters correspond with similar parts throughout the several views, the frame 10, wheel 11, seat 12, and plow plates 13, being of ordinary construction, are not described in detail. The plow beams 14 and 15 are also of ordinary construction, but they are combined with the other elements of the invention, as hereinafter set forth and claimed. Where plow beams of this character are secured together by a bolt or rivet adjacent their rear ends, such bolt or rivet may be removed so as to replace the same with a bolt or securing element 16, which not only secures the plow beams together, but also forms a means for attaching the other elements of the invention, as will presently appear. The invention consists broadly of the bolt 16, a disk or segmental member 17, a second disk or plate 18, an arm 19, a fender plate 20, a hand-lever 21, and a spring 22.

The segmental member or casting 17 is formed with a groove 23, a series of teeth 24, a hub 25, and a bore or aperture 26, which is concentric with the hub 25. The bolt or securing element 16 extends through the aperture 26 and through the beams 14 and 15, and secures the beam 15 in the recess 23, at the same time securing the plate 18 on the end of the hub 25. The bolt 16 is preferably provided with two nuts which coöperate to prevent disengagement of the bolt 16 from the aperture 26.

The plate 18 is preferably formed from a blank of sheet metal and is provided with an annular flange 27, which is notched to provide shoulders 28 and 29. The shoulders 28 are spaced apart approximately equal the distance across the hand-lever 21 where the latter extends between these shoulders; and this pair of shoulders, as well as the shoulders 29 extend laterally of the body of the plate 18 toward the body of the member 17. The length of the shoulders 28, however, is several times greater than the thickness of the hand-lever 21, and the latter is provided with a bearing aperture 30 (see Fig. 8), which is longer than the diameter of the hub 25, so that this lever may be swung laterally of its length into the position shown in Fig. 6, so as to release the lever 21 from one of the notches 24, and engage it with another of these notches without disengaging the lever from the space between the shoulders 28. In other words, the hand-lever 21 is continually in engagement with the notch between the shoulders 28 and adapted to be in and out of engagement with the notches 24. It will be seen, therefore, that when the lever 21 is swung on its pivot element (the hub 25), this movement of the lever turns the plate 18 on its pivot element (the bolt 16) thereby shifting the position of the shoulders 29.

The arm 19 is adapted to rest upon one of the lower shoulders 29, while the corresponding one of the upper shoulders may be employed for pressing the arm 19 downward. By referring to Fig. 7, it will be seen that the space between the shoulders 29 of each pair is greater than the distance across the arm 19, where the latter extends between the shoulders, and therefore the arm 19 has a limited amount of movement about its pivot (the hub 25) independently of the plate 18 and the handle 21. This feature allows the arm 19 and its fender plate 20 to swing upward when the plate collides with an obstruction thereby avoiding breakage or distortion of the fender plate and arm. Referring again to Fig. 7, it will be seen that an arm 31 is formed integrally with the arm 19 and extends in a diametrically opposite direction thereto and coöperates with the other pair of shoulders 29, and with the hub 25 for supporting the fender plate in each of its adjusted positions.

The compression spring 22 is disposed between the plate 18 and the arm 19, and presses the latter against the lever 21, so as to coöperate with the arm 19 for holding the lever 21 in whichever of the notches 24 it is placed.

Referring now to Fig. 1, it will be seen that the handle 21 is conveniently located with relation to the seat 12, so that the arm 19 and fender 20 may be adjusted by a driver or operator sitting in the seat 12. Obviously, this results in a great saving of time, as no tool is required for adjusting the fender plate, and the time which would be required for obtaining and applying a tool is eliminated; and moreover, the time of dismounting and remounting the machine is eliminated, for when the driver wishes to raise or lower the fender plate, he merely presses the lever 21 laterally, and then pushes or pulls the same forward or rearward until the desired position of the fender plate 20 is attained, and then allows the spring 22 to press it into the adjacent notch 24. This is of very great importance when the plow or cultivator is to be turned at the end of a row, for it is then desirable to raise the fender plate out of engagement with the ground, and above the tops of the plants being cultivated. This may be done without raising the shovels or plates 13, or, if desirable, the beams 14 and arm 19 may be raised bodily in the usual manner.

Although I have described this embodiment of my invention very specifically, it is not intended to limit this invention to these exact details of construction and combination of parts, but I am entitled to make changes within the inventive idea set forth in the foregoing description and following claims.

What I claim is:

1. In a combination, a segmental member comprising teeth extending in the direction of its axis and providing notches, an arm pivotally mounted on said segmental member and being adjustable for a useful purpose, a lever pivotally mounted on said segmental member, and a plate pivotally mounted on said segmental member and having pairs of spaced shoulders, the pivotal centers of said arm and lever and plate being alined with one another, said arm extending between the shoulders of one pair, said lever extending between the shoulders of another pair and being engageable alternatively with the teeth of said segmental member.

2. In a combination, a segmental member comprising teeth extending in the direction of its axis and providing notches, an arm pivotally mounted on said segmental member and being adjustable for a useful purpose, a lever pivotally mounted on said segmental member, a plate pivotally mounted on said segmental member and having pairs of spaced shoulders, the pivotal centers of said arm and lever and plate being alined with one another, said arm extending between the shoulders of one pair, said lever extending between the shoulders of another pair and being engageable alternatingly with the notches of said segmental member, the space between the shoulders of the last said pair being wider than the portion of said arm within said space so as to allow a movement of said arm relative to said lever.

3. In a combination, a segmental member having notches and having a hub, a pivot element extending axially outward from said hub, a plate pivotally mounted on said pivot element and having shoulders thereon extending toward said segmental member, an arm pivotally mounted on said hub between said plate and segmental member and adapted to rest on one of said shoulders and being adjusted by movement of the latter, a lever movably engaged with said hub and extending between two of said shoulders and being movable alternately into engagement with the notches of said segmental member while remaining between said shoulders, and a spring between said plate and segmental member and yieldingly retaining said lever in its engagement with said segmental member.

4. The combination with a beam; of a segmental member formed with a groove in which said beam is seated, said member also being formed with an axially apertured hub and with a series of teeth; an arm pivotally mounted on said hub and being adjustable for a useful purpose; an actuating lever pivotally mounted on said hub; a plate having shoulders extending toward said segmental member; and a securing element on which said plate is pivotally mounted, said securing element extending through said beam and apertured hub and plate and securing all these elements together.

5. In combination, a pivotally mounted element to be adjusted, a segmental member having teeth extending substantially parallel to its axis and providing notches between the teeth, a connecting member mounted for rotary movement and having a pair of shoulders extending substantially parallel with its axis, an actuating lever having all its parts stationary relative to one another, and means supporting said pivotally mounted element and segmental member and connecting member and actuating lever in axial alinement with one another, said pivotally mounted element being engaged with and movable by said connecting member, said actuating lever being movable into alternate engagement with said notches while continually extending between said shoulders and being coöperative with the latter for imparting said rotary movement to said connecting member.

In testimony whereof I have hereunto set my hand.

CLARENCE C. LEDERER.

Copies of this patent may be obtained for five cents each, by addressing the "Commissioner of Patents, Washington, D. C."